United States Patent [19]

Hoffman et al.

[11] 4,417,144

[45] Nov. 22, 1983

[54] MODULAR SOLID-STATE DETECTOR CELL

[75] Inventors: David M. Hoffman, New Berlin; Neil W. Loomis, Muskego; Ralph C. Ehlert, Milwaukee; Peter S. Shelley, Brookfield, all of Wis.

[73] Assignee: General Electric Company, Milwaukee, Wis.

[21] Appl. No.: 236,738

[22] Filed: Feb. 23, 1981

[51] Int. Cl.$^3$ .............................................. G01T 1/22
[52] U.S. Cl. ..................................... 250/367; 250/370
[58] Field of Search ................... 250/363 S, 366, 367, 250/370, 385; 378/4, 11, 14

[56] References Cited

U.S. PATENT DOCUMENTS

| | | | |
|---|---|---|---|
| 4,031,396 | 6/1977 | Whetten et al. | 250/385 |
| 4,119,853 | 10/1978 | Shelley et al. | 250/385 |
| 4,161,655 | 7/1979 | Cotic et al. | 250/385 |
| 4,181,856 | 1/1980 | Bone | 250/367 |
| 4,187,427 | 2/1980 | Cusano | 250/367 |
| 4,210,805 | 7/1980 | Kobayashi et al. | 250/370 |
| 4,338,521 | 7/1982 | Shaw et al. | 250/366 |

Primary Examiner—Janice A. Howell
Attorney, Agent, or Firm—Leydig, Voit, Osann, Mayer & Holt, Ltd.

[57] ABSTRACT

A modular solid-state detector cell which intimately associates a scintillator body with a pair of photoresponsive semiconductors so as to present on a single collimator plate all of the elements necessary for transforming incident X-radiation into a measurable electrical signal. The detector is provided with a precision slotted mounting arrangement for receiving the unit cells, and the cells when positioned within the detector assembly have the photoresponsive semiconductors enclosed within the light tight cell. The unit is adaptable to off-line testing of the separate cells for screening before assembly.

8 Claims, 5 Drawing Figures

U.S. Patent  Nov. 22, 1983  4,417,144
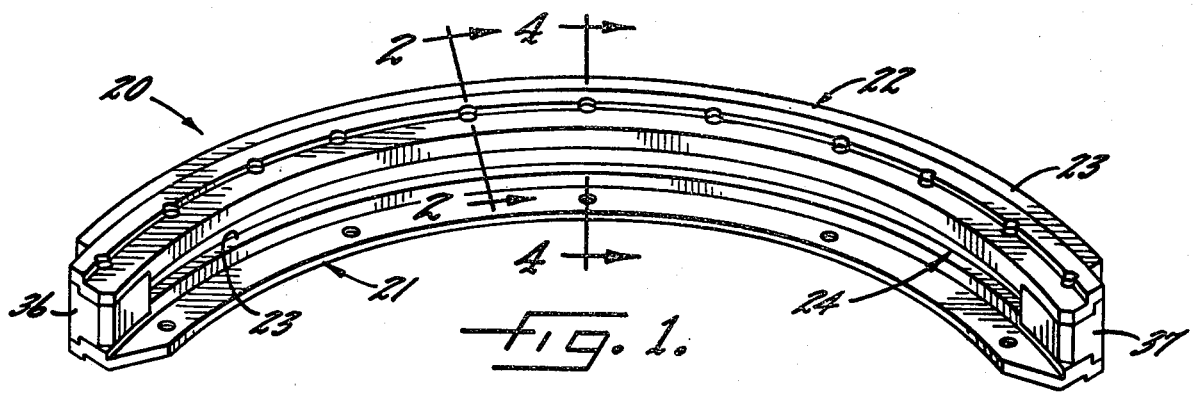
fig. 1.
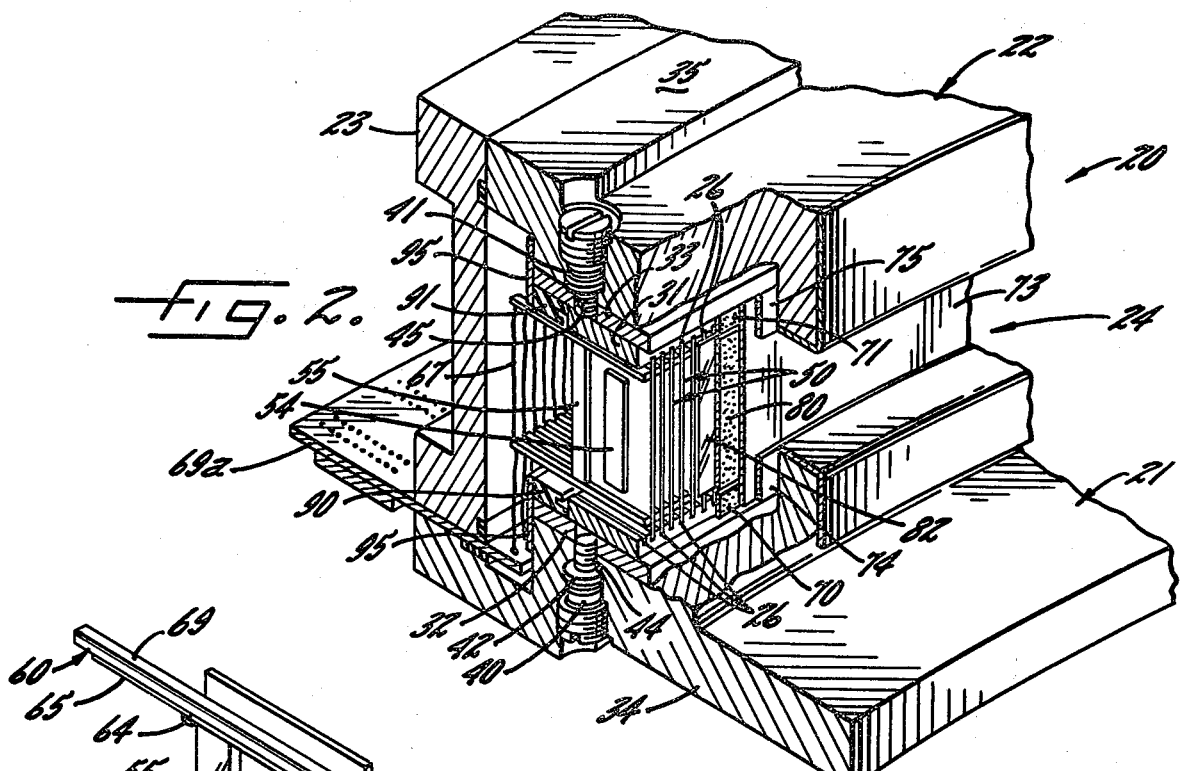
fig. 2.
fig. 3.
fig. 5.

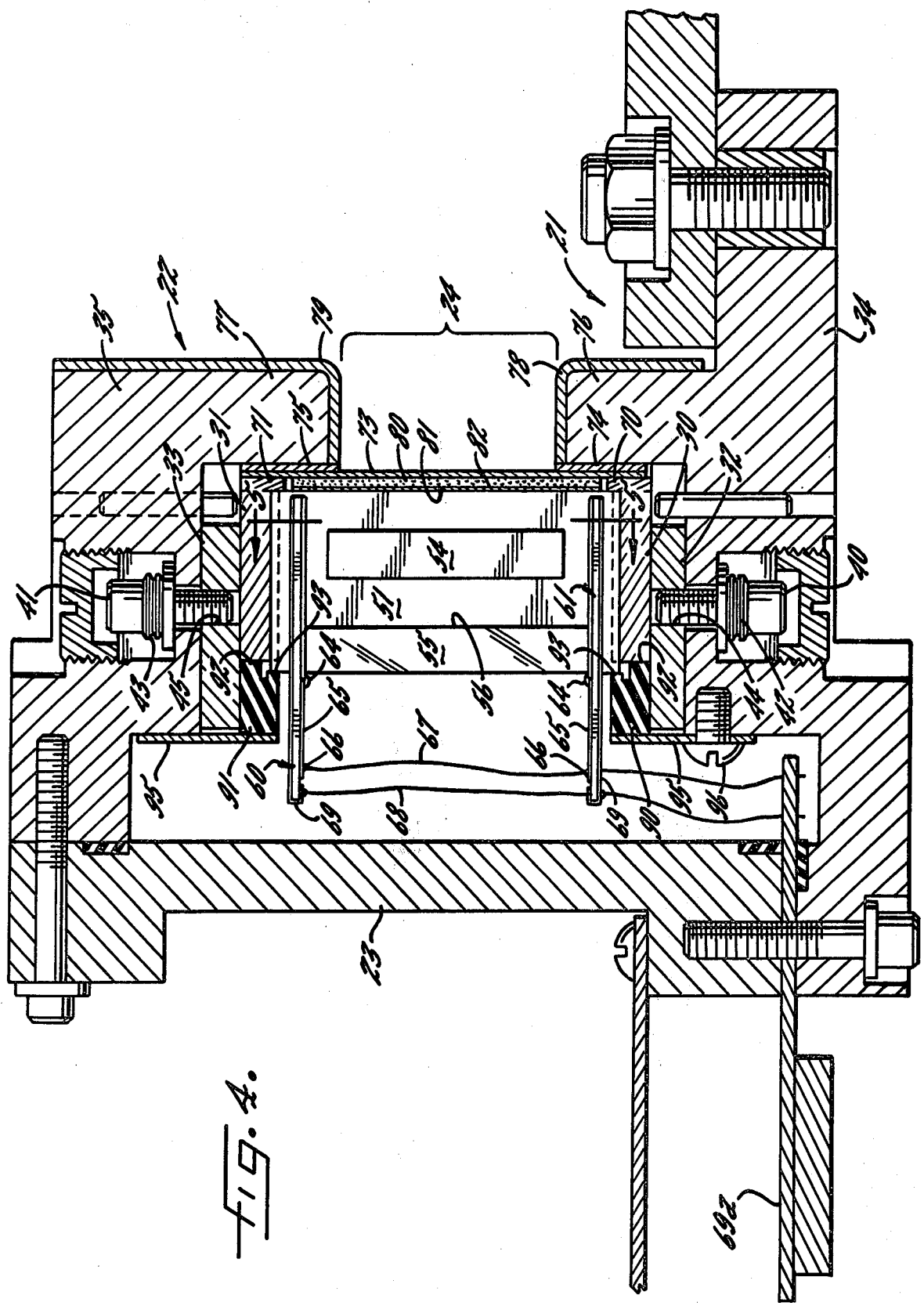

MODULAR SOLID-STATE DETECTOR CELL

This invention relates to X-ray detectors (apparatus for converting incident X-ray photons into a measurable electrical signal) and more particularly to the class of X-ray detectors which have come to be known as "solid state".

Detectors of this sort have an important use in CT scanners. In contrast to the early primitive scanners using only one or a very small number (about 30) detectors, modern scanners incorporate hundreds of detector cells, attempt to pack them as tightly as practical to increase spatial resolution, and make them as efficient as practical in order to increase contrast resolution.

A successful CT detector is described in the following U.S. patents: Whetten et al. U.S. Pat. No. 4,031,396; Shelley et al. U.S. Pat. No. 4,119,853; and Cotic et al. U.S. Pat. No. 4,161,655. That type of detector uses xenon gas under high pressure and operates on the principal of detecting X-rays by their proportional ionization of the xenon gas. The ionization charge in the xenon gas is collected in an electric field established by spaced parallel tungsten plates and the charge collected is proportional to the number of X-rays absorbed in the gas.

While high pressure xenon detectors of that type have met with considerable success, certain improvements would be of even further benefit to the CT art. Improvement in the quantum detection efficiency, typically about 35%, would allow increased contrast resolution or decreased dose or both. Due to the high voltage electric fields within the xenon detector, microphonics (induced plate motion effects) can become a problem, requiring ripid construction and vibration isolation. Linearity, that is cell to cell response matching, requires very careful screening procedures for the components. Due to the fact that the system will not work as an X-ray detector until it is charged with gas, uniformity is not finally determined until the cell is completely assembled. An out of specification condition requires complete disassembly and rework.

While the aforementioned problems are not insurmountable in producing a practical xenon detector, adoption of a solid state approach can avoid many of the consequences.

Among the solid state detectors proposed heretofore is the reflective cavity cell shown in Cusano U.S. Pat. No. 4,187,427. The interior of each cell is rendered highly reflective in order to minimize optical losses in transmission of light from the scintillating crystal to the photodetector diodes positioned at the ends of the cell. That patent suggests mounting the sensing diodes external to the cell (to protect them from incident radiation), but creates the possibility of light leakage between cells causing cross talk. In addition, the diodes must be carefully aligned with their associated cells during the assembly operation, requiring a high degree of care on the part of the assembler. Finally, the sensing diode and its scintillating crystal are first associated during the assembly operation, and can be disassociated by replacing or relocating one but not all of such elements.

In view of the foregoing, it is a general aim of the present invention to provide an improved reflective cavity cell which minimizes the possibility of cell cross talk and, at the same time, eases the assembly operation.

Accordingly, it is an object of the present invention to minimize the critical tolerances which need to be given attention during final assembly of detector cells into a reflective cavity array.

It is a subsidiary object to provide a unitary cell which can be pretested before assembly, so that characteristics of a plurality of cells can be pre-matched prior to assembly.

Other objects and advantages will become apparent from the following detailed description when taken in conjunction with the drawings in which:

FIG. 1 is a perspective view showing a detector assembly exemplifying the present invention;

FIG. 2 is a partial sectional perspective taken along the line 2—2 of FIG. 1;

FIG. 3 is a perspective view showing a single element unitary cell;

FIG. 4 is a sectional view taken along line 4—4 of FIG. 1; and

FIG. 5 is a view taken along the line 5—5 of FIG. 4 showing a plurality of unitary cells in a detector assembly.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, FIG. 1 shows a detector assembly of the type particularly suited for use in a rotate-rotate CT scanner. The detector has a housing 20 which is arcuate in shape, and which includes a pair of end members 21, 22, a rear wall 23 and a front window 24 enclosing a volume containing a plurality of detector cells. When disposed in a CT scanner, the detector array 20 is mounted opposite an X-ray source, with the focal spot of the source being located at the center of the detector arc. The X-ray source and detector are fixed with respect to each other so that a fan beam swath of radiation produced by the source falls on the detector window 24, to produce a plurality of electrical signals, one from each cell within the detector assembly. The source-detector assembly is rotated about a patient aperture to produce a large number of X-ray readings which are transmitted to the reconstruction computer which computes the CT image.

As best shown in FIG. 2, each of the end members 21, 22 of the housing 20 is a composite assembly having a plurality of slots 26 for receiving the unit cell assembly to be described below. The slots are aligned with the X-ray source so that, with the unit cells in place, a plurality of detector cells are created which measure incident radiation in small increments over the detector arc. For the sake of convenience and because of the proven reliability for accurately mounting tungsten plates in a CT detector, a precision, dimensionally stable, machined ceramic substrate used in a commercial embodiment of the aforementioned xenon detector (and described in the aforementioned Shelley patent) is preferably employed for the purpose of providing the opposed unitary cell mounting slots. To that end, arcuate machineable glass ceramic sections 30, 31, preferably of Macor (trademark designation of Corning Glass Works for machinable glass ceramic), have precision machined therein a plurality of slots 26 which establish the cell position and spacing for each of the cells in the detector array. For convenience, the Macor sections can be modularized in 6 or 7 inch lengths for assembly in end to end fashion. The sections are bonded to mounting substrates 32, 33, preferably of titanium or type 430 stainless steel which have a thermal coefficient of expansion which closely matches that of Macor. Other compatible materials can be used if desired. The so-bonded subassemblies are then located within the detector body comprising arcuate members 34, 35, preferably of aluminum, joined at a predetermined distance by end members 36, 37 (FIg. 1). The assembly is further rigidified by the affixation of rear cover 23. Because the aluminum members have a coefficient of thermal expansion substantially different from the Macor-stainless steel subassemblies, the composite end members 21, 22 are brought together by means adapted to allow relative movement between those elements. More particularly, cap screws 40, 41 acting through bellville washers 42, 43 into threaded holes 44, 45 in the stainless steel substrates tend to draw the substrates with bonded Macor plates to the aluminum channels. As best shown in FIG. 4, sufficient clearance is left between the shank of the cap screws 40, 41 and the aluminum bodies 34, 35 to allow for slight relative movement which might be caused by a change in temperature.

In accordance with the invention, in combination with the precision mounting arrangement described thus far, there is provided a unitary detector cell having on a single substrate all of the elements necessary for converting incident X-ray flux to a measurable electrical signal. As a special feature of the invention, such a unit cell is easily positionable in any of the cell positions in the detector array and need only be secured in position and electrically connected to perform its intended function. Accordingly, the so-produced detector array is comprised of a plurality of cells which are easily interchanged or replaced as the need arises.

Attention is directed to FIG. 3 which illustrates a unitary detector cell 50 embodying the aforementioned principles of the invention. The cell is formed on a base plate 51 of high density material such as tungsten which serve as collimators for the respective cells. Bonded to the face 52 of the plate 51 is a scintillator body 54 mounted with its long axis parallel to the forward edge of plate 51. X-radiation falling on the cell is absorbed by the scintillator body which produces light in proportion to the amount of X-radiation absorbed. The presently preferred scintillator material is cadmium tungstate which exhibits very low hysteresis, very low afterglow and high Z axis uniformity. However, other scintillator materials such as cesium iodide activated with thallium can also be used.

In order to maximize light collecting efficiency within the cell, the tungsten plate 51 is first polished and then surface coated on both faces 52, 53 with a highly reflective material. It is presently preferred to apply a thin layer of silver by evaporative or sputter coating techniques following which a protective coating of magnesium fluoride is applied. For the purpose of recapturing light which might otherwise escape from the rear of the cell, the plate has affixed thereto a reflective bar 55 positioned generally parallel to the scintillator and to the rear edge of the plate. Although the bar can be of metal, we prefer to use boro silicate glass because its coefficient of thermal expansion is very like that of tungsten, and to deposit on the face 56 a reflective aluminum surface.

In practicing the invention, associated with the scintillator 54 and associated reflective elements are photoresponsive means, shown herein as a pair of PIN photodiode assemblies 60, 61 precisely positioned with respect to the other elements and bonded to the plate 51 to convert the light generated by the scintillator 54 in response to receipt of X-ray flux into a measurable electrical signal. Preferably the diodes are operated in the photovoltaic mode, and the current produced thereby is sensed as a measure of incident X-ray flux. The active diode sensing surface, indicated at 62, substantially covers the entire end of the associated reflective cell. the active diode element is bonded by means of conductive epoxy to a substrate 63, which is preferably a ceramic material having a coefficient of thermal expansion very near that of the associated tungsten plate 51. The ceramic substrate can be molded and/or machined to relatively tight tolerances, to provide a flat mounting surface for accurately positioning the diode on its mounting plate. A pair of wire leads 64 connect the active diode element to a printed circuit conductor 65 having mounting pads 66 for attachment of wires to connect the unit cell to the remaining CT electronics.

In order to maximize signal level, the PIN photodiodes 60, 61 are utilized in pairs, with one at either end of the reflective chamber. Operating the diodes in the photovoltaic mode allows the signals to be summed by simply connecting the diodes in parallel using a wire conductor so that the sum of the currents produced by the two diodes is applied to the sensing electronics of the scanner. As best shown in FIG. 4, a common signal wire 67 joins the signal paths 65 of the diodes 60, 61 and connects them to a printed circuit board 69a at the input of the data acquisition system subassembly. A common return wire 68 connects to a conductive foil 69 of each diode which is in electrical contact with the diode substrate by way of the aforementioned conductive epoxy.

It is important to note that the diode assemblies 60, 61 are positioned on the tungsten plate at a distance from the upper and lower edges thereof. First of all, that provides the advantage of substantially reduced or eliminated cross talk which might otherwise occur between cells with diodes disposed above the collimator plates and outside the cells. An additional advantage is the accurate cell positioning achieved by rendering the plate compatible with the aforementioned precision slotted structure.

Turning briefly to FIG. 5, there are shown a plurality of unit cells 50 disposed in side by side relationship in a portion of the array of FIG. 1. It is seen that the flat collimator plates 51 closely fit in opposed slots 26 in the slotted composite end members 21, 22. The diodes 60, 61 are within the cell and are shielded from leakage of light between cells by virtue of the close fit of the plates 51 into the slots 26. The rear reflective bar 55 prevents substantial loss of illumination to the rear of the cell. In combination with the front seal soon to be described, the cell is sufficiently light tight so that cross talk in a large array is not a problem.

In operation, flux incident on the array of FIG. 5 (directed into the paper) strikes the scintillators 54. Absorption of the X-ray photons by the scintillator raises the atoms in the scintillator to higher energy states which subsequently decay to lower energy states with the emission of a characteristic wave length band of light. The light either directly falls on the sensitive surfaces 62 of the opposed diodes 60, 61 or is reflected thereto by the surface 52 of the associated detector, the surface 53 of the adjacent detector, the reflective surface 56 of the end member 55 or some combination thereof in order to cause the diodes to produce an electrical signal which is coupled to the acquisition electronics of the CT scanner to produce a reading for that particular cell.

It is important to note, as shown in FIG. 5, that each cell is virtually complete in and of itself; the only element which needs to be added to complete the cell (with the exception of the front window to be described below) is the reflective wall provided by the adjacent cell. Since that surface is fairly constant from cell to cell, the unit cell disclosed herein can be easily tested in a fixture to predetermine its characteristics after manufacture and before assembly in an array. Accordingly, it is now possible to grade cells according to actual measured characteristics and group cells with similar characteristics for later installation in proximity. Finally, it will be appreciated that the unit cell can be assembled by precision pick-and-place machines to eliminate the human error element, and to accurately and repeatably locate the cell components with respect to each other.

The ability to either prescreen cells for matching characteristics, or to exchange cells within an array depending on array performance is particularly important when it is appreciated that one desires to have each cell respond like its neighbors, but that some cells are more important than others to the reconstructed image. More particularly, the most important cell in the entire array is the one in the center since it senses the rays through the exact center of the object and is thus involved in the reconstruction of every pixel. The least important are those at the edges of the array which sense rays which pass through only the edge portions of the body. It has been found that optimizing approximately the center 50 cells with respect to linearity and performance, is most important and that the remaining cells outboard thereof, while of importance, need not be given the same attention as the middle 50. Thus, since the unit cell described and claimed herein now makes it possible to prescreen cells for exactly matched characteristics (or build an array, test it then interchange cells), the center 50 can be matched to the greatest extent possible, to yield even more accurate reconstructions.

While the unit cells can be mounted in the detector array in various ways, such as by epoxy bonding utilized in the aforementioned xenon detector, or by various other mechanical means, we prefer to utilize the resilient mounting techniques described and claimed in Hoffman et al. U.S. application Ser. No. 236,804, filed concurrently herewith and assigned to the same assignee as this invention. That application describes a detector window which performs the functions of preventing entry of light into the cells, minimizing absorbed radiation in the front window, preventing cross talk around the leading edge of the plate between cells, and in one embodiment enhancing the reflective capability of the cell. Associated with a front window of that character are resilient means for urging a plurality of plates against a front stop and into contact with the front window to firmly but resiliently fix the plates in position and provide a front edge light seal.

Referring more particularly to FIGS. 2 and 4, there are shown a pair of front stop members 70, 71 associated with the slotted portion of the end members 21, 22. The stop members are arcuate in shape and, in order to provide a thermal match with the slotted support, can be made from titanium or 430 stainless steel, as are the base plates 32, 33. Preferably, the members 70, 71 are bonded to the Macor elements 30, 31 for defining an arcuate plate reference position for each plate in the assembly.

For sealing the array from entry of external light while at the same time minimizing absorption of X-ray flux, the front window 24 is closed by means of a graphite window element 73. Preferably, the window is formed of a non-metallic base made up of three or more layers of graphite fibers, each layer woven into a cloth and bonded together with epoxy. The epoxy composition is optimized to provide a good thermal match to the tungsten and Macor elements in the cell. Preferably gasket strips 74, 75 are disposed between ribs 76, 77 of the aluminum end members and the graphite window. The ribs 76, 77 also provide convenient surfaces for mounting lead shields 78, 79 which define the window 24 and protect the PIN photodiodes 60, 61 from direct receipt of X-radiation.

Referring again to the graphite window 73, there is affixed to the inner surface thereof an elongated resilient strip 80 dimensioned to fit between the stop members 70, 71 and, in the non-compressed state, to project slightly into the cell beyond the plate reference position established by the stops. Accordingly, it will be appreciated that insertion of a plate into its associated slots, and forcing of the plate forward against the stops will cause a slight compression of the resilient strip 80 thereby effecting a light seal between adjacent cells. It is preferable to provide means on the inner surface 81 of the resilient material 80 to reflect light back into the cell, further enhancing light collecting efficiency. To accomplish that, a strip of reflective mylar 82 is affixed to the surface 81 of the resilient material 80 with the reflective surface facing into the cell.

As described in the aforementioned concurrently filed application, acting in concert with the window elements described above are resilient means for forcing a plurality of unitary cells into the front window to both accurately position each cell and produce the desired light seal. To that end, there are provided a pair of resilient locking members 90, 91, preferably neoprene rubber having a durometer of about 50. The rubber elements are preferably on the order of one or two inches long so that they are associated with a limited number of cells. Each element has a major leg 92 for engaging the Macor slotted elements 30, 31 and a minor leg 93 for simultaneously engaging a corner of the plate 50. A non-resilient member, such as plate 95, of the same length as the reilient mount 90 is secured to the rear inner surface of the aluminum housing by screws 96, thereby engaging the major leg 92 with the Macor base and slightly deforming the minor leg 93 by contact with the edge of the plate, positively forcing the plate to and holding it in the plate reference position with its forward edge against the stops 70, 71 and impinging the entire forward edge into the reflective mylar, creating an effective light seal.

In the manufacturing operation (or in field replacement if necessary) there are no critical tolerances which need attention from the workman when inserting or interchanging cells. More particularly, the critical tolerances are achieved by a fixture and jig in the factory when the diode, scintillator and other elements are positioned on the plate. When a plate is to be inserted, it need only be slid into its slot and locked in position. When the preferred resilient mount is used, it forces the plate in question and its neighbors into the reference position and, at the same time creates a light seal. If it is desired to change a cell in the field, the serviceman need only remove the plates 95 for the cell in question, lift out the resilient mounts 90 for the cell in question, unsolder the two wires from the DAS interconnect board 69a for the cell in question, then slide the cell from its mount. A new cell is replaced by simply reversing the operation while the serviceman need give no attention to critical tolerances since they are automatically achieved when the cell is relocked in position.

We claim as an invention:

1. In a scintillation detector for a CT scanner, the improvement comprising, a pair of opposed detector end members carrying a plurality of slots aligned to intercept a swath of radiation from an X-ray source in the scanner, a plurality of flat collimator plates dimensioned to closely fit in opposed slots in the end members to define a plurality of detector cells, a scintillator body and at least one photoresponsive semiconductor secured to each plate whereby each cell is independently provided on a single substrate with means to transform incident X-radiation into a measurable electrical signal.

2. A unit cell element for a multichannel scintillation detector of a CT scanner, the detector being of the type having a plurality of slots in opposed end members defining associated cells having predetermined cell widths and disposed for alignment with an x-ray source of the scanner to intercept a swath of radiation therefrom, the unit cell comprising in combination a collimator plate dimensioned to slidingly but sungly fit in opposed slots in said end members, a scintillator body thinner than the cell width so as to fit within the associated cell, the scintillator body being secured to the collimator plate and disposed to intercept a portion of the swath or radiation when the plate is in the end members, at least one photoresponsive semiconductor thinner than the cell width so as to fit within the associated cell, the photoresponsive semiconductor being secured to the collimator plate and disposed out of the swath of radiation but leaving opposed edges of the plate free to engage the slots in the end members.

3. In a scintillation detector for a CT scanner having a plurality of collimator plates defining a plurality of associated detector cells of predetermined width, and a plurality of scintillator bodies mounted on the respective collimator plates, the improvement comprising a pair of arcuate opposed slotted end members forming two sides of a detector chamber, the slots being dimensioned to slidingly but snugly receive opposed edges of a collimator plate and positioned to align the associated collimator plate with an X-ray source of the CT scanner thereby to form a plurality of detector cells of said predetermined width, and a plurality of photoresponsive semiconductors each dimensioned to be smaller than the detector cell width so as to fit within the associated cell, means mounting a pair of said photoresponsive semiconductors on each collimator plate leaving opposed edges of the collimator plate free to engage the slots in the arcuate wall members, the photoresponsive semiconductors being located within the associated cell to receive illumination only from the scintillator body therein.

4. The structure as set out in any of claims 1–3 wherein the photoresponsive semiconductor comprises a ceramic substrate molded to form a flat mounting surface for engaging the collimator plate, a PIN photodiode, means bonding the photodiode to the ceramic substrate for accurate positioning with respect to the scintillator body.

5. The structure as set out in claim 4 wherein a pair of photoresponsive semiconductors are mounted on each collimator plate, and means connecting each pair of photoresponsive semiconductors in parallel for summing the current produced thereby.

6. The structure as set out in any of claims 1–3 including means for shielding the photoresponsive semiconductors from the X-ray source.

7. The structure as set out in any of claims 1–3 wherein each collimator plate includes a layer of silver evaporated thereon, and a protective coating over the silver layer.

8. The structure as set out in any of claims 1–3 wherein each collimator plate further includes a reflective bar aligned with and facing the scintillator body, said bar being affixed to the collimator plate for preventing escape of illumination.

* * * * *

UNITED STATES PATENT AND TRADEMARK OFFICE
CERTIFICATE OF CORRECTION

PATENT NO. : 4,417,144

DATED : November 22, 1983

INVENTOR(S) : David M. Hoffman, Neil W. Loomis, Ralph C. Ehlert and Peter S. Shelley It is certified that error appears in the above-identified patent and that said Letters Patent is hereby corrected as shown below:

Col. 1, l. 35, change "ripid" to -- rigid --.

Col. 4, l. 7, change "the", last occurrence, to -- The --.

Col. 6, l. 46, change "reilient" to -- resilient --.

Claim 2, col. 7, l. 31, change "or" to -- of --.

Signed and Sealed this

Twentieth Day of March 1984

[SEAL]

Attest:

GERALD J. MOSSINGHOFF

Attesting Officer     Commissioner of Patents and Trademarks